United States Patent Office 2,802,361
Patented Aug. 13, 1957

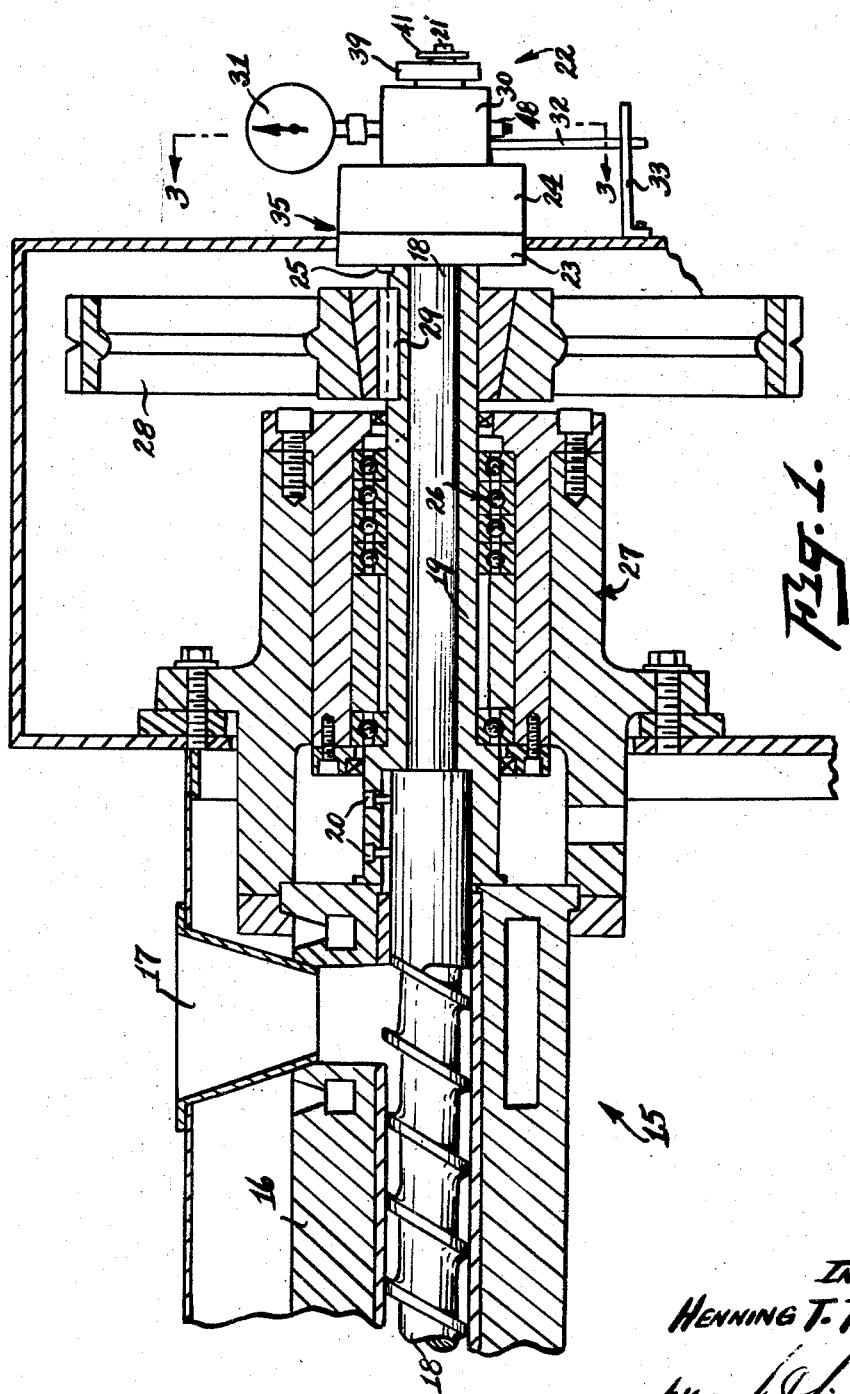

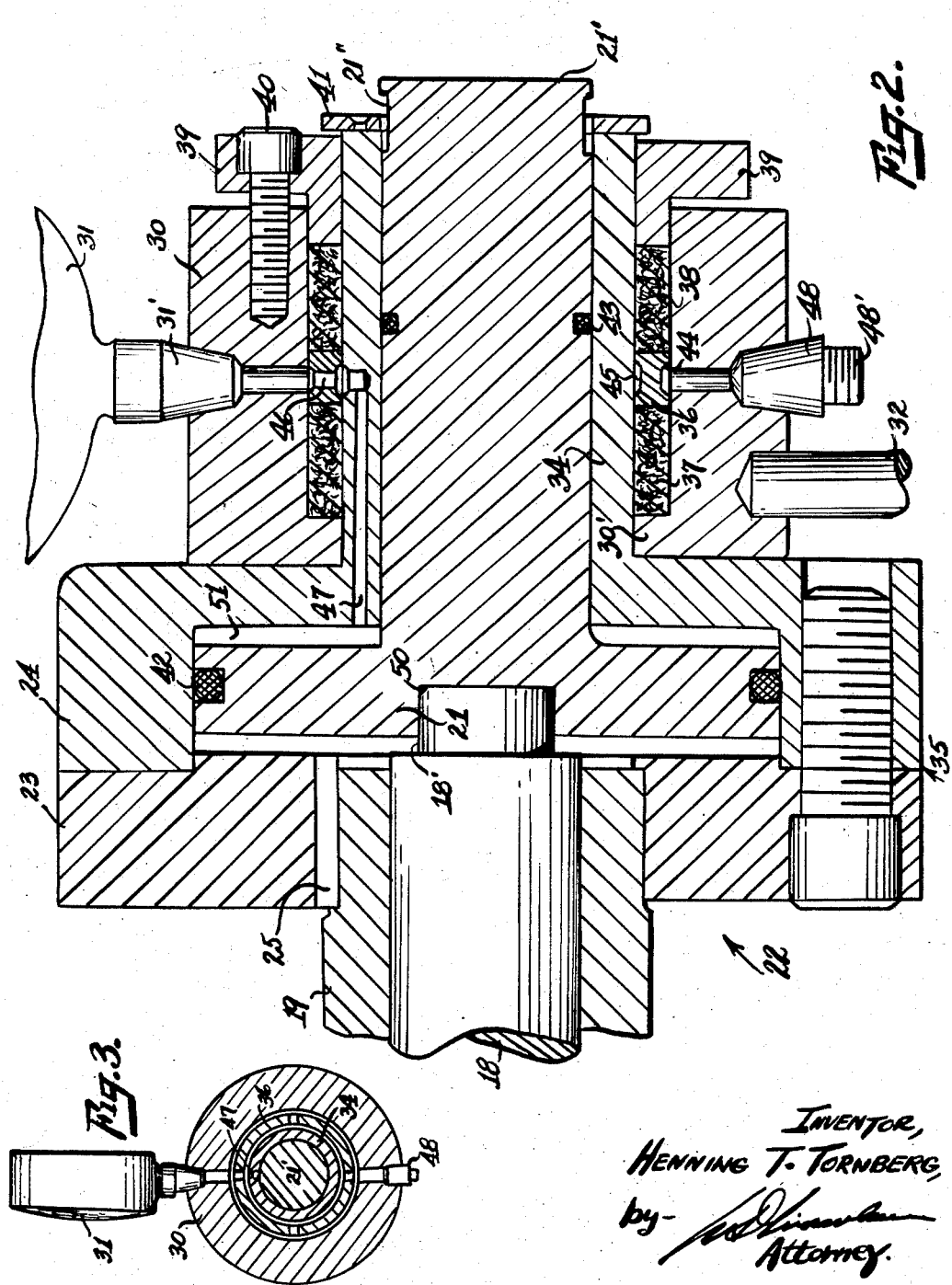

2,802,361

MEANS TO INDICATE THE THRUST IN A REVOLVING SHAFT IN MACHINERY

Henning T. Tornberg, Ridgewood, N. J., assignor to Modern Plastic Machinery Corp., Lodi, N. J., a corporation of Delaware Application December 27, 1954, Serial No. 477,699

4 Claims. (Cl. 73—140)

The present invention relates to means to measure the thrust a revolving shaft is subjected to in a machine, and as an example is adapted for use in plastic extrusion machines of the type having a conveyor screw rotatable within a cylinder; said screw feeding plasticized material through an extrusion die under appreciable pressure. In such machine, this pressure-responsive means would measure such pressure to indicate various control measures to be attended to by the operator.

Many attempts have been made to provide means to determine the pressure existing at the discharge end of the conveyor screw or at the entrance port of the extrusion die, but such have failed or have proven unsatisfactory because of the high temperatures which exist at such regions. It is therefore an object of this invention to provide a novel and improved mechanism which is responsive to such pressure at the "cold" end of the conveyor screw.

In many plastic extruders of the type mentioned, there are material-screening structures between the screw discharge end and the die intake port. When these screens become clogged or partially so, the pressure recited, rises sharply. It is therefore another object of this invention to provide novel and improved pressure-responsive means applicable in extrusion machinery, to indicate the occurance of such objectionable condition so that the cleaning of the screens may be attended to.

Optimum operating pressures are many a time defeated by die design. It happens that their intake ports need relief to attain the desired result. It is therefore one of the objects of this invention to provide a novel and improved means for indicating and/or for actually measuring the pressure existing at die entrance so that it is known for any purposes intended.

A further object hereof is to provide a novel and improved highly sensitive pressure-responsive means so that extremely slight changes in the mentioned pressure or in the thrusts in shafts generally, are readily discernable.

Since the conveyor screw of the plastic extruder needs to be removed to clear the cylinder from time to time; such removal being from the "cold" or rear end of the cylinder, it is another object of this invention that the pressure-responsive mechanism be carried on such conveyor screw, so that the removal of the screw is made easy.

A further object of this invention is to provide novel and improved apparatus of the character described, which is adaptable to be an attachment to many types of existing extrusion machines and anywhere else the thrust in a shaft is to be measured and which is efficient in carrying out the purposes for which it is designed.

Other objects and advantages will become apparent as this disclosure proceeds.

In the drawings forming part of this specification, similar characters of reference indicate corresponding parts in all the views.

Fig. 1 is a fragmentary, central longitudinal sectional view of an extruding machine embodying the teachings of this invention. The discharge end of the machine which includes the die is not shown, but is well understood in the art as a continuation of this view to the left of the part shown. This Fig. 1 shows the hopper-end of the conveyor screw in its cylinder, the bearing structure for supporting said screw, the drive gear or pulley for said screw and at the extreme right is shown the pressure-indicating means which is the subject of this invention.

Fig. 2 is an enlarged sectional view of said pressure-indicating means shown in Fig. 1.

Fig. 3 is an enlarged section taken at lines 3—3 in Fig. 1, drawn to a scale different than that of Fig. 2.

In the drawings, the numeral 15 designates generally a plastic extrusion machine having the cylinder 16 in which, material fed from the hopper 17, is plasticized in manner well known, and conveyed by the rotatable conveyor screw 18 through a die at the left end of the cylinder in Fig. 1. The die-end of said screw and the die itself are not shown because only the rear end of the machine is illustrated in this view; the die-end being usually the front end. Particularly that part of the screw 18 which is shown to the right of the hopper 17 in Fig. 1, shall be deemed the rear end of such screw.

A tubular member has a sleeve portion 19 about an inward portion of the rear end of the screw 18 and is keyed to said screw at 20 so that said tubular member and screw rotate together, though said screw 18 is free for some longitudinal movement through said tubular member a distance to the right equal to the scope of movement of the piston 21 of the illustrated hydraulically-operated pressure gage apparatus indicated generally by the numeral 22. This piston is slidable within its cylinder which is made up of the members 23, 24 keyed at 25 to the sleeve 19. Such sleeve is rotatably mounted in a bearing structure indicated generally by the numeral 26 which is secured on the main frame 27 of the machine 15. The mentioned gage structure 22 extends rearwardly from said bearing structure and the said sleeve 19 carries thereon a drive gear or pulley 28 keyed at 29, so that upon rotation of such gear, the conveyor screw 18, the sleeve 19 and all its appurtenances will rotate. It is to be noted that sleeve member 30 having the pressure gage 31 thereon, is held against rotation by the bar 32 which extends therefrom to be in contact with the member 33 extending from the frame 27.

The piston rod 21' is slidably fitted and extends through and preferably out of the neck 34 with which the cylinder 35 is provided. The sleeve 30 is positioned about said neck 34, has an inward flange 30' at one end to serve as a bearing on said neck, is otherwise spaced from the peripheral outer surface of said neck and thus provides a tubular space between itself and such neck for the ring 36, which is held in said space between the packing members 37, 38 by the gland 39. Said ring 36 is really positioned in a stuffing box structure described. The said gland is held in place by screws as 40 which hold it mounted on the sleeve 30. The mentioned ring 36 and the tubular packing members 37, 38, are of course on and about the cylinder's neck 34. The length of such neck is to allow slight longitudinal movement for the gland 39 thereon and the assembly is maintained by the ring 41, which is secured on the end surface of the said neck and provides an outward flange therefor. The piston 21 and its rod 21' are in precision sliding fit within the cylinder 35 and the neck 34 thereof respectively and leakage is further prevented by the O-shaped packing rings 42 on the periphery of the piston and 43 on the piston rod, in suitable annular grooves therefor provided.

The ring 36 fits precisely between the cylinder neck 34 and the sleeve 30, and has an annular channel in each of two opposite surfaces thereof. In the embodiment illustrated these channels 44 and 45 are on the outer periphery and on the inside of the ring 36 respectively. These channels are connected by at least one hole 46 through the body of said ring 36. There is at least one duct 47 which makes the cylinder 35 communicative from behind the piston 21, with the channel 45. The sleeve 30 has at least two radial bores in the embodiment shown. These are communicative with the interior of the said sleeve and the ring 36 is so positioned that said bores be communicative with the channel 44. One of these bores is for mounting the intake port 31' of the gage 31, while the other is for a removable plug 48. The piston rod 21' is coaxial with the conveyor screw 18; the remote rear end of the latter being preferably reduced as at 18' and in rotational fit in a socket 50 in the face of the piston 21.

Plug 48 is a check valve, the details of which are not shown, with intake connection 48' for attaching a pump syringe means for filling the cylinder space 51 behind the piston 21, duct 47, the channels 44, 45 and their connecting hole 46 and the pressure responsive chamber of the gage 31 which may be of the Bourdon type, with a suitable non-compressible liquid as water or mercury. Such pump is worked to build up a pressure in such closed hydraulic gage system, about equal to normal pressure acting on the conveyor screw to shift it rearward, when the extruder is operating in normal fashion.

A properly working extruder 15 equipped with the pressure gage apparatus 22 as herein set forth, is set in operation whereby said machine extrudes plasticized material. The pressure existing at die-end will cause the conveyor screw 18 to shift towards the rear end, meaning it will move to the right in Figs. 1 and 2. A syringe or pump apparatus is now attached to the intake port 48' and operated to inject a non-compressible liquid under pressure until the piston 21 stands at about the middle of its possible stroke. Piston position is judged by the position of the ring 41 across a preferably colored annular lane 21" on the piston rod 21. Such lane may be the floor of an annular channel as shown in Fig. 2. Such piston movement has of course caused a corresponding forward shift of the conveyor screw 18. The syringe or pump means not shown, is now detached. Should the pressure at die-end of the extruder 15 increase, the said screw will move towards the right and hence shift the piston 21 in like direction, whereby the pressure existing at the die-end of the machine will show on the gage 31. Should the pressure at die-end of the machine decrease, the screw 18 will move to the left and due to the pressure existing in the hydraulic system of the gage apparatus 22, the piston 21 will follow the screw and the gage 31 will read the new pressure axisting at die end. It is to be noted that in the embodiment illustrated, slight longitudinal movement of the conveyor screw 18, will actuate the gage because the piston area acted on by the liquid in 51, is several times the cross-sectional area of the screw end 18'.

While the machine 15 is operating, the cylinder 35 and the piston 21 will rotate, but member 30 will remain at rest. And though ring 36 may or may not rotate, the closed fluid system will be connecting space 51 with the gage 31, for the fluid will reside continuously in and fill duct 47, channel 45, hole 46 and channel 44 and of course the chamber 51 and the passages of the gage 31.

This invention is capable of numerous form and various applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein to indicate the scope of this invention.

I claim:

1. In an apparatus to measure the thrust a revolving shaft is subjected to, a tubular member positioned in its entirety about said shaft and spaced from one end of same; said shaft being keyed to said tubular member to turn therewith and to be free for longitudinal sliding movement with respect thereto, a fixed bearing structure supporting said tubular member for rotation therein a cylinder securely carried on the end of said tubular member which is nearest said end of the shaft; said cylinder having at least a portion thereof which can rotate within a bearing, a sleeve about said portion serving as a bearing therefor and in which it may revolve while said tubular member revolves, means to hold said sleeve from turning, a piston slidably fitted within the cylinder, capable of movement therein along the axis line of the shaft; the mentioned end of said shaft extending for contact with a face of said piston; said cylinder being a communicative extension of said tubular member; the sleeve having a hole in its wall, an hydraulically-operated pressure gage having its intake port communicatively connected to said hole at one end of such hole, a ring positioned between and in contact with said cylinder and the sleeve; said ring having an annular channel communicatively with the other end of said hole; said ring having a second annular channel; said cylinder being closed rearward of the piston and having a duct communicatively connecting the space at the other face of the piston in the cylinder with said second annular channel in the ring; said ring having a hole therethrough connecting both said annular channels whereby a passage is provided connecting the mentioned space in the cylinder with the gage and a substantially non-compressible liquid filling said space, passage and gage, and means including said liquid yieldingly urging said shaft and piston in the direction opposite to the thrust the shaft is subjected to.

2. The apparatus as defined in claim 1, wherein the sleeve is provided with a second hole in its wall; one end of said hole being communicative with the second annular channel in the ring and including a check valve closing the other end of this last mentioned hole in the sleeve.

3. The apparatus as defined in claim 1, wherein the sleeve-supported portion of the cylinder is a neck extending from said cylinder away from the shaft; said neck having a bore therein and including a piston rod extending from the piston, slidably positioned in said bore; the sleeve and the ring being about said neck; the annular channels being one around the inside surface of the ring and one around the outer circular periphery of said ring.

4. The apparatus as defined in claim 3, wherein there is space within the sleeve at each side of the ring and including leak-proof packing material filling the space at both sides of the ring within the sleeve.

References Cited in the file of this patent

UNITED STATES PATENTS

| | | |
|---|---|---|
| 1,272,041 | Herr | July 9, 1918 |
| 2,089,604 | Hagy | Aug. 10, 1937 |
| 2,281,871 | Corby | May 5, 1942 |
| 2,411,971 | MacMillin et al. | Dec. 3, 1946 |
| 2,457,902 | Jones | Jan. 4, 1949 |
| 2,566,854 | Rhodes | Sept. 4, 1951 |

FOREIGN PATENTS

| | | |
|---|---|---|
| 76,898 | Australia | June 25, 1919 |